United States Patent
Alavi

(10) Patent No.: US 11,734,299 B2
(45) Date of Patent: Aug. 22, 2023

(54) MESSAGE TEMPLATIZATION FOR LOG ANALYTICS

(71) Applicant: BUSINESS OBJECTS SOFTWARE LTD., Dublin (IE)

(72) Inventor: Arta Alavi, Andresy (FR)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 91 days.

(21) Appl. No.: 17/333,392

(22) Filed: May 28, 2021

(65) Prior Publication Data

US 2022/0382776 A1 Dec. 1, 2022

(51) Int. Cl.
*G06F 16/25* (2019.01)

(52) U.S. Cl.
CPC .................. *G06F 16/258* (2019.01)

(58) Field of Classification Search
CPC .................................................... G06F 16/258
See application file for complete search history.

(56) References Cited

U.S. PATENT DOCUMENTS

| | | | | |
|---|---|---|---|---|
| 2004/0254919 A1* | 12/2004 | Giuseppini | ........... | G06F 16/903 707/E17.135 |
| 2014/0122931 A1* | 5/2014 | Devale | ................ | G06F 11/0784 714/37 |
| 2014/0365828 A1* | 12/2014 | Jiang | ................... | G06F 11/0709 714/37 |
| 2019/0163594 A1* | 5/2019 | Hayden | ............... | G06F 11/0793 |
| 2021/0065078 A1* | 3/2021 | Gardner | ............ | G06Q 10/0633 |

FOREIGN PATENT DOCUMENTS

CN 109308289 A * 2/2019

OTHER PUBLICATIONS

Huang et al. (Huang et al., Paddy: An Event Log Parsing Approach using Dynamic Dictionary NOMS 2020-2020 IEEE/IFIP Network Operations and Management Symposium, pp. 1-8). (Year: 2020).*

* cited by examiner

*Primary Examiner* — Cheyne D Ly
(74) *Attorney, Agent, or Firm* — Mintz Levin Cohn Ferris Glovsky and Popeo, P.C.

(57) ABSTRACT

A method, a system, and a computer program product for templatizing error messages in computing systems. An error log generated as a result of an execution of at least one task of a computing system is monitored. The error log includes a plurality of error messages. Each error message includes a first portion and a second portion. Each error message is extracted from the generated error log. One or more error message processing rules for converting each error message into a corresponding template format error message is determined. The error message processing rules are associated with at least one task. The determined error message processing rules are executed to convert each extracted error message into the corresponding template format error message. The converted error message includes the first portion, where the second portion is removed from the converted error message. A converted error log is generated.

20 Claims, 13 Drawing Sheets

[]:aa0e3b76-fe99-4b31-a1c6-bef60345fccf:2;ppro-core;application;10.0.137.124;8370f88f-a84d-402c-534d-bac0b8f8ef4;ERROR;com.sap.aa.ii.backend.framework.newimpl.odata.base.ODataServiceFactory;Error while handling ODATA request;109f10c6-26b9-42e0-9804-a623a5db0b5e;saceu10;fd99fabe-0363-47fa-795d-8a89af8ca00c;55881cee-9331-4a9d-af3e-b4a53b2c4ace;sac;[com.sap.aa.mapj.common.lang.UnexpectedException:
java.lang.reflect.InvocationTargetException,
at com.sap.aa.mapj.data.DataObjectManager.findObjectReferencedBy(DataObjectManager.java:1205),
at com.sap.aa.mapj.data.security.SecureDataObjectManager.findObjectReferencedBy(SecureDataObjectManager.java:142),
at com.sap.aa.mapj.data.DataObjectManager.findObjectReferencedBy(DataObjectManager.java:1172),
at com.sap.aa.mapj.olingo.processor.DataObjectEntitySetProcessor.getDataObject(DataObjectEntitySetProcessor.java:764),
at com.sap.aa.mapj.olingo.processor.DataObjectEntitySetProcessor.getDataObject(DataObjectEntitySetProcessor.java:396),
at com.sap.aa.mapj.olingo.processor.DataObjectEntitySetProcessor.getEntity(DataObjectEntitySetProcessor.java:168),
at com.sap.aa.mapj.olingo.processor.EntitySetProcessor$Proxy.getEntity(EntitySetProcessor.java:755),
at com.sap.aa.mapj.olingo.processor.ServiceProcessor$1.getEntity(ServiceProcessor.java:377),
at com.sap.aa.mapj.olingo.processor.ServiceProcessor.readEntity(ServiceProcessor.java:146),
at org.apache.olingo.odata2.core.Dispatcher.dispatch(Dispatcher.java:146),
:

```
def TemplatizeMessage(m):                            ⎯ 402
    if m.startswith(r'An error occurred while executing task'):
        return 'error executing TASK'                ⎯ 404
    elif m.startswith(r'Fail to remove references to user'):
        return 'fail remove USER for CLASS'
    elif m.startswith(r'Failed to drop table'):
        return 'failed drop TABLE'
    elif m.startswith('Could not get any tenant information for tenant'):
        return 'Could not get any tenant information for tenant T'
    elif m.find("Error DB connection: com.sap.analytics.cloud.orca.OrcaCFConnectionContext@")!=-1:
        return "Error DB connection"
    elif m.startswith('Retry of Reconnect to JMS - count'):
        return 'Retry of Reconnect to JMS'
    elif m.startswith(r'Nie można było zapisać prognoz do wersji'):
        return r'Could not save forecasts'
    elif m.find(r'Unable to write forecast. Forecast dates may be outside the time range of the corresponding planning model')!=-1:
        return r'Could not save forecasts'
    ...
    elif m.find('System error: Socket is closed')!=-1:
        return 'System error: Socket is closed'
    elif m.find('Unknown host sql')!=-1:
        return 'Unknown host sql'
    else:
        return m
```

```
def replaceregstring(s0):
    s = s0
    s = re.sub(r'An error occured during (.*?) task.*', r'error during PHASE TASK', s) if s==s0 else s
    s = re.sub(r'The (.*?) service returned the (.*?) status code while the application was expecting one of .*', r'SERVICE returned CODE', s) if s==s0 else s
    s = re.sub(r'(.*?) failed to establish connection.*', r'METHOD failed to establish connection', s) if s==s0 else s
    s = re.sub(r'The (.*?) service response full content was.*', r'SERVICE response: MESSAGE', s) if s==s0 else s
    s = re.sub(r'(.*?) failed due to the error from Connection Broker.*', r'METHOD failed due Connection Broker', s) if s==s0 else s
    s = re.sub(r'Segment .*? execution failed.*', r'Segment SEGMENT execution failed', s) if s==s0 else s
    s = re.sub(r'(.*?)\(\) for servlet (.*?) in context with path (.*) threw exception.*', r'SERVICE@SERVLET threw exception', s) if s==s0 else s
    s = re.sub(r'(.*?) - Status: (.*?) -.*?"errorMessage\":[\"]?(.*)[\"]?\}\.*', r'errorMessage":(.*)\}\.*', r'\2', s) if s==s0 else s
    s = re.sub(r'== error on job: (\d+), message: \{"errors":\[\{"errorCode":"(.*)","errorMessage":(.*)?\}\]\}.*', r'\3', s) if s==s0 else s
    s = re.sub(r'An retryable error occurred while executing task TaskExecutionRequest (.*)?: (.*)?: (.*)?", r'\1', s) if s==s0 else s
    s = re.sub(r'The .* service response full content was "{"message":"(.*?)", r'\1', s) if s==s0 else s
    s = re.sub(r'Unexpected character .*?..*', r'Unexpected character CH', s) if s==s0 else s
    s = re.sub(r'com.sap.db.jdbc.exceptions.(.*?)?[:]?.*', r'com.sap.db.jdbc.exceptions.\1', s) if s==s0 else s
    s = re.sub(r'Failed to read object.*? in database.*', r'Failed to read object OBJECT in database', s) if s==s0 else s
    s = re.sub(r'.*Model .*? does not exist.*', r'Model MODELNAME does not exist', s) if s==s0 else s
    s = re.sub(r'.*Provided data source .*? was not found in schema DRA.*', r'Provided data source DATASOURCE was not found in schema DRA', s) if s==s0 else s
    s = re.sub(r'.*Dataset .*? could not be found.*', r'Dataset could not be found', s) if s==s0 else s
    return s
```

| APP.msg | template_message |
|---|---|
| An error occurred during train task 'null': 'Missing alias APL/TargetKey for target "_Amount/Qty._"'. Caused by: {} | An error occurred during <PHASE> task <TASK> |
| An error occurred while executing the JSON RPC method 'list'. | JSON RPC Error |
| Segment '["New York City"]' execution failed: {} | Segment execution failed |
| SQL execution failed : SAP DBTech JDBC: [13000]: user-defined error: "310264227"."(DO statement)": line 9 col 1 (at pos 736): [13000] (range 3) user-defined error exception: [{"severity":"ERROR" | SQL execution failed |

| APP.correlation_id | APP.organization_name | landscape | APP.component_name | APP.logger | APP.thread | Classification |
|---|---|---|---|---|---|---|
| Unassigned | - | AP10 | hcppredictiveservice | com.sap.cloud.security.config.Service | main | Unassigned |
| Unassigned | - | AP10 | hcppredictiveservice | com.sap.hcp.cf.logging.servlet.dynlog.PublicKeyReader | main | Unassigned |
| Unassigned | - | AP10 | hcppredictiveservice | com.sap.orca.starter.xs2.connection.broker.Xs2CachedConnectionBroker | scheduling-1 | Unassigned |
| Unassigned | - | AP10 | hcppredictiveservice | com.sap.orca.starter.xs2.connection.broker.Xs2CachedConnectionBroker | scheduling-1 | Unassigned ⎫ 806 |
| Unassigned | - | AP10 | hcppredictiveservice | com.sap.orca.starter.xs2.connection.broker.Xs2ConnectionBroker | scheduling-1 | Unassigned |
| Unassigned | - | AP11 | hcppredictiveservice | com.sap.cloud.security.config.Service | main | Unassigned |
| Unassigned | - | AP11 | hcppredictiveservice | com.sap.hcp.cf.logging.servlet.dynlog.PublicKeyReader | main | Unassigned |
| Unassigned | - | BR10 | hcppredictiveservice | com.sap.cloud.security.config.Service | main | Unassigned |
| Unassigned | - | BR10 | hcppredictiveservice | com.sap.hcp.cf.logging.servlet.dynlog.PublicKeyReader | main | Unassigned |

FIG. 8-3

MESSAGE TEMPLATIZATION FOR LOG ANALYTICS

TECHNICAL FIELD

This disclosure relates generally to data processing and, in particular, to templatization of messages in error logs generated by various software applications for the purposes of performing log analysis.

BACKGROUND

In today's world, many companies rely on software applications to conduct their business. Software applications deal with various aspects of companies' businesses, which can include finances, product development, human resources, customer service, management, and many other aspects. Software applications typically operate from servers and can be stored in memory.

Managing a quality of cloud system and/or application can be a challenge. Computing services that may be part of such cloud system and/or application may generate large amounts of data (e.g., gigabytes, etc.) in a form of logs and/or any other information that may be hard to analyze. It is important to perform analysis of such logs (e.g., error logs, execution logs, etc.) to determine an overall health of the system, analyze errors, etc. However, current analytics tools for such analysis are not capable of providing information that can be quickly processed to analyze errors.

SUMMARY

In some implementations, the current subject matter relates to a computer-implemented method for templatizing error messages. The method may include monitoring an error log generated as a result of an execution of at least one task of a computing system. The error log may include a plurality of error messages. Each error message in the plurality of error messages may include a first portion and a second portion. The method may further include extracting each error message from the generated error log, and determining one or more error message processing rules for converting each error message into a corresponding template format error message. The error message processing rules may be associated with the task. The may also include executing the determined error message processing rules to convert each extracted error message into the corresponding template format error message. The converted error message may include the first portion, wherein the second portion may be removed from the converted error message. Using each converted error message, a converted error log may be generated.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 illustrates an exemplary error log that may be generated by the execution of the software applications, computing components, etc. that may be associated with the system shown in FIGS. 1-2;

FIG. 4*a* illustrates exemplary simple text substitutions generated for various error messages, according to some implementations of the current subject matter;

FIG. 4*b* illustrates exemplary regular expressions generated for various error messages, according to some implementations of the current subject matter;

FIG. 5 illustrates an exemplary table containing error messages in a templatized format, according to some implementations of the current subject matter;

FIG. 8-1 to FIG. 8-3 (hereinafter, "FIG. 8") illustrate an exemplary interactive dashboard, according to some implementations of the current subject matter;

DETAILED DESCRIPTION

To address the deficiencies of currently available solutions, one or more implementations of the current subject matter provide for an ability to templatize various error messages in error logs generated by various software applications for the purposes of perform log analysis so as to improve resolution of various software applications' errors and/or conflicts.

In some implementations, the current subject matter may be configured to execute monitoring of various log(s) (e.g., error logs) that may be generated by a computing system (e.g., cloud computing system, application, etc.) during operation, execution of its components, etc. and perform tracking of error(s), number(s) of errors, specific pattern(s) of error(s), etc. and use that information for analysis and as part of an alerting mechanism. As part of the monitoring, the current subject matter may be further configured to extract and/or remove various contextual information from the log message(s) and generate non-contextual and/or comparable error messages that may be indicative of the issues and/or errors that may affecting the computing system and may need to be resolved to ensure its operation. Moreover, the current subject matter may be configured to implement various template(s) to generate such non-contextual and/or comparable error messages (e.g., "templatized messages"). In some exemplary implementations, one or more templates used for generation of the templatized messages may be selected from a plurality of existing templates, which may have been previously generated (e.g., as a result of a previous analysis), have been pre-loaded into the computing system, and/or generated on-the-fly (e.g., in real-time).

Figure 1:
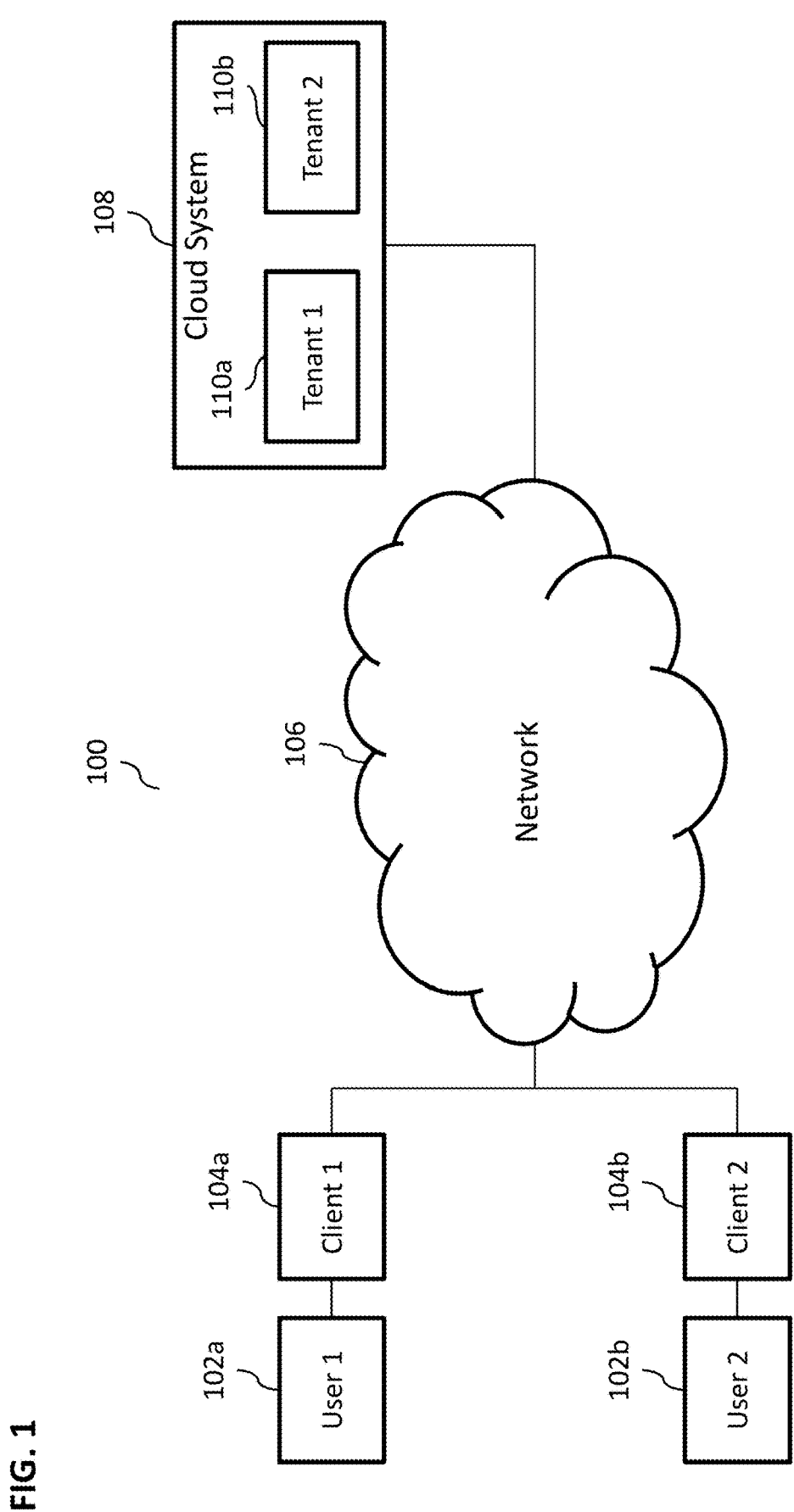
FIG. 1 illustrates an exemplary cloud computing system that may be configured to implement log monitoring and/or templatization processes, according to some implementations of the current subject matter.

FIG. 1 illustrates an exemplary cloud computing system 100 that may be configured to implement log monitoring and/or templatization process(es), according to some implementations of the current subject matter. The cloud computing system 100 may include a cloud system and/or cloud application 108. The cloud system 108 may be configured to provide a variety of services including, for example, software-as-a-service (SaaS), platform-as-a-service (PaaS), and/or the like. These services may be accessible to one or more tenants of the cloud system 108 including, for example, a first tenant 110a and a second tenant 110b. For example, as a platform-as-a-service tenant, the first tenant 110a and/or the second tenant 110b may use the cloud system 108 for the development and/or deployment of services and/or applications. Alternately and/or additionally, as a software-as-a-service tenant, the first tenant 110a and/or the second tenant 110b may utilize the applications and/or services running on the cloud system 108.

The cloud system 108 may host a plurality of cloud services and/or cloud applications. For example, the cloud services may include application services, machine learning, Internet-of-Things services, big data services, security services, and/or any other services and/or applications. In some exemplary implementations, the cloud system 108 may include a runtime container, which may supports execution of the application services, machine learning, Internet-of-Things services, big data services, security services, etc. The cloud applications may include a plurality of applications including, for example, a human resources application, a business-to-business procurement application, an e-commerce application, a vendor management system (VMS) application, an expense reporting application, and/or any other applications. The system 108, cloud services, and/or cloud applications may be configured to generate one or more error logs during operation and/or execution. The error logs may be indicative of various problems, errors, exceptions, etc. that may have been encountered, generated, etc. by the system 108, cloud services, and/or cloud applications. The templatization and/or analysis of these errors may be configured to be performed by the system 108 and/or any computing component outside of the system 108.

As shown in FIG. 1, users associated with the first tenant 110a and/or the second tenant 110b may access the services (e.g., software-as-a-service, platform-as-a-service, etc.) provided by the cloud system 108 via a network 106. The network 106 may be any wired and/or wireless network such as, for example, a public land mobile network (PLMN), a wide area network (WAN), a local area network (LAN), the Internet, and/or the like. A first user 102a may communicate with the cloud system 108 via any wired and/or wireless device such as, for example, a first client 104a. A second user 102b may also communicate with the cloud system 108 via any wired and/or wireless device such as, for example, a second client 104b. The first client 104a and/or the second client 104b may be communicatively coupled with the cloud system 108 via the network 106. Further, it should be appreciated that the first user 102a and/or the second user 102b may communicate with the cloud system 108 via different devices than shown.

The first user 102a and the second user 102b may access the system, applications, services, etc. provided by the cloud system 108 by being associated with one or more tenants of the cloud system 108 including, for example, the first tenant 110a and/or the second tenant 110b. To illustrate, the first user 102a may be associated with the first tenant 110a and may access data and/or resources associated with the first tenant 110a. The second user 102b may be associated with the second tenant 110b and may access data and/or resources associated with the second tenant 110b. However, it should be appreciated that the first user 102a and the second user 102b may both be associated with either the first tenant 110a or the second tenant 110b.

Figure 2:
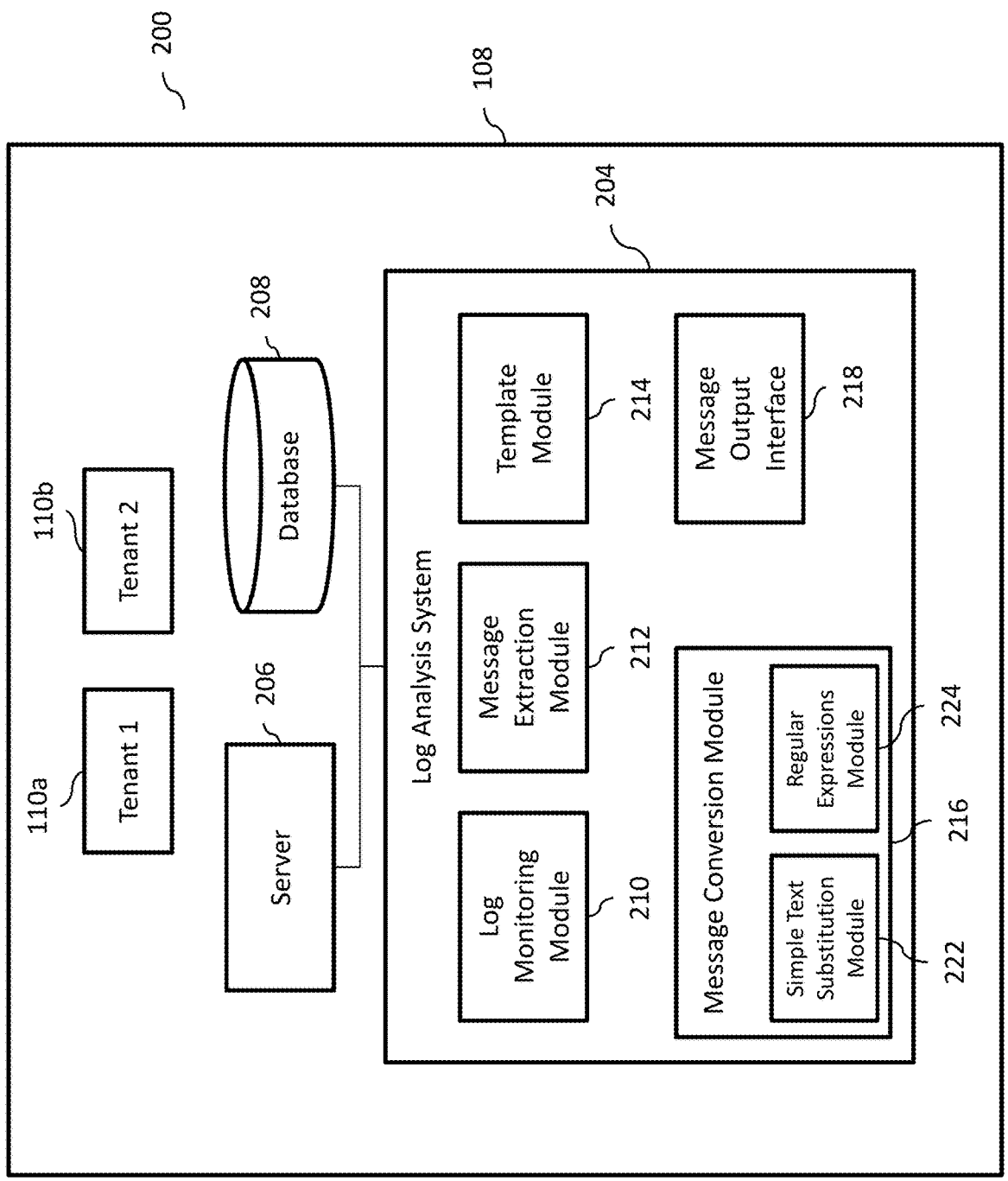
FIG. 2 illustrates an exemplary system for executing an error message analysis and templatization, according to some implementations of the current subject matter.

FIG. 2 illustrates an exemplary system 200 for executing an error message analysis and templatization, according to some implementations of the current subject matter. One or more components of the system 200 may be incorporated into the cloud system 108, shown in FIG. 1. In particular, the cloud system 108, in addition to the tenants 110, may be configured to also include a log analysis system 204, a server 206, and a database 208. As stated above, a user (e.g., user 102a, 102b, shown in FIG. 1) may access the cloud system 108 for performing various tasks. The user may be an individual user, a software application, a process, and/or any other user and/or any combination thereof. Performance and/or execution of tasks by the system 108 and/or any of its components may be configured to generate various logs, e.g., execution logs, error logs, etc.

The generated logs may be processed by the server 206 and/or stored in the database 208. The log analysis system 204 may be configured to access the processed logs for the purposes of performing analysis and/or templatization, which may include removal of various contextual information through, for example, simple text substitution and/or use of regular expression algorithms. Such removal of contextual information and/or templatization may be configured to greatly reduce the number of different messages that may be included in the logs. For example, an error log containing an error directed to execution of a function of a software application may include different contextual information (e.g., different processed input data, etc.), but the error causing generation of the error message may be the same regardless of the context. Additionally, the error may be generating different error messages at different times, thereby including different contextual information in the error messages. This may create a multitude of error messages that are all related to the same error in the software application, thereby making analysis of the error expensive and time-consuming. By templatizing the error messages, the current subject matter system may be configured to reduce the number of error messages that may be related to the same error.

Referring back to FIG. 2, the log analysis system 204 may include software, hardware, and/or any combination thereof. The system 204 may be communicatively coupled to the server 206 and/or the database 208 and/or any other components of the cloud system 108. The server 206 may perform various functionalities, e.g., obtaining and/or storing data from/to the database 208. The database 208 may store various data, including execution data, log data, metadata, which may be used by the system 108 for performing various functions.

In some implementations, the log analysis system 204 may be configured to include a log monitoring module 210, a message extraction module 212, a template module 214, a message conversion/transformation module 216, and a message output interface 218. The components 210-218 may be configured to be communicatively coupled with one another and/or with any other component of the log analysis system 204 and/or cloud system 108.

The log monitoring module 210 may be configured to execute monitoring of error logs and/or any other logs. For ease of description and illustration only, the following discussion will refer to error logs and error messages, but as can be understood, the current subject matter may be applicable to any type of logs. The error logs may be generated by execution of various software applications and/or software application components by the cloud system 108. In some exemplary implementations, the error logs may be directly supplied to the log analysis system 204, e.g., by the server 206.

FIG. 3 illustrates an exemplary error log 300 (e.g., a portion of a single row in an error log) that may be generated by the execution of the software applications, computing components, etc. that may be associated with the cloud system 108. The error log 300 may include information that may have application messages, exception stack trace, thread information, and/or any other information. A substantial portion of the error log 300 may include various contextual information that might not be necessary for the purposes of analysis of an error and/or determination what caused an error and/or how to resolve it.

In particular, an exemplary error log row may include various mandatory data and/or attributes such as, for example, 'APPlogger', 'APP.msg', etc. It may also include various data and/or attributes, such as, for example, 'APP.correlation_id' (may be used for tracking user interaction when errors occur; this identifier may also be linked to a user session identifier, e.g., to indicated that an application failed/was failing to comply with one or more mandatory attributes), 'APP.tenant_id' (may be used to indicate a location where an error occurred with respect to a particular tenant), 'APP.stacktrace', etc. The APP.msg attribute may include one or more error message(s) from the application logger. Such error messages may be in the following exemplary format (in some cases, an error message may also include a stack trace which may embed a specific error message):

An error occurred during train task 'null': 'Missing alias APL/TargetKey for target "_Amount/Qty._"'. Caused by: { }
An error occurred while executing the JSON RPC method 'list'.
Segment '["New York City"]' execution failed: { }
SQL execution failed: SAP DBTech JDBC: [13000]: user-defined error: "310264227". "(DO statement)": line 9 col 1 (at pos 736): [13000] (range 3) user-defined error exception: [{"severity": "ERROR« . . . .

Referring back to FIG. 2, a message extraction module 212 may be configured to extract error messages from the received error logs that are being monitored by the log monitoring module 210. The extracted error messages may be configured to include various information, data, etc. such as identification of a nature of the error (e.g., "SQL execution failed") as well as include various contextual specifics of the error (e.g., "SAP DBTech JDBC: [13000]: user-defined error: "310264227". "(DO statement)": line 9 col 1 (at pos 736): [13000] (range 3) user-defined error exception: [{"severity":"ERROR«"). The latter aspects might not be relevant to what the specific error is and/or which tasks may need to be performed to correct the error.

In some implementations, the template module 214 may be configured to execute a script that may select a specific template for a particular message. For example, the template module 214 may be configured to include a plurality of message templates that may be used for conversion of a specific error message into a standardized or templatized format that may be easily readable during analysis of the error message. Alternatively or in addition, a message conversion module 216 may be configured to dynamically generate templates for error messages contained in the error log. A simple text substitution module 222 of the message conversion module 216 may be executed to convert "raw" error messages into a standardized or templatized format.

FIG. 4a illustrates exemplary simple text substitutions 400 generated for various error messages by the simple text substitution module 222, according to some implementations of the current subject matter. For example, an error "An error occurred while executing task" 402 may be converted using simple text substitution into 'error executing TASK' 404. In some implementations, the message conversion module 216, as shown in FIG. 2, may be configured to identify one or more keywords in the raw error message 402 that may be indicative of a specific error and, using those keywords, generate a standardized/templatized error message 404. Upon conversion of the raw error message, the simple text substitution module 222 may be configured to return the generated standardized/templatized error message for display, transmission, etc. by the message output interface 218.

In some implementations, where simple text substitution is not possible, the message conversion module 216 may be configured to include a regular expressions module 224. In some exemplary implementations, system 200 may be configured execute simple text substitution process on an error message, and if that does not change the error message into a templatized format, the system 200 may be configured to execute regular expressions process by the regular expressions module 224. Moreover, the system 200 may incorporate a filtering mechanism that may be executed to automatically forward error messages to the regular expressions module 224 for templatization, where it may be already known that a simple text substitution process cannot be executed on a particular error message for templatization purposes. FIG. 4b illustrates exemplary regular expressions 410 generated for various error messages by the regular expressions module 224, according to some implementations of the current subject matter. For example, a raw error message of "re.sub(r' An error occurred during (.*?) task.*'" 412 may be returned as "error during PHASE TASK" 414. Similarly, once the raw error message 412 has been converted using the regular expressions module 224, the module 224 may return the generated standardized/templatized error message for display, transmission, etc. by the message output interface 218.

In some implementations, the current subject matter system 204, either through use of pre-defined templates, simple text substitution, regular expressions, and/or any other processes may be configured to remove contextual information from raw error messages contained in the error log. As stated above, such removal of contextual information may be configured to reduce cardinality of the dimensions of the error messages (i.e., APP.msg). Instead of the error message, a template message (e.g., template_message) may be generated by the system 204.

FIG. 5 illustrates an exemplary table 500 containing the above error messages in a templatized format. As shown in FIG. 5, original messages (APP.msg) are shown in column 502 and corresponding templatized messages (template_message) are shown in column 504.

For example, the error message of An error occurred during train task 'null': 'Missing alias APL/TargetKey for target "_Amount/Qty._"'. Caused by: { } may be standardized/templatized as An error occurred during <PHASE> task <TASK>. The error message An error occurred while executing the JSON RPC method 'list'. may be presented in a template format as JSON RPC Error, as shown in column 504 in FIG. 5. Similar conversions may be performed for other error messages shown in FIG. 5 (and/or for any other error messages contained in the error log). In some implementations, the message output interface 218, shown in FIG. 2, may be configured to display, transmit, etc. the table 500. Alternatively, or in addition to, the message output interface 218 may be configured to display, transmit, etc. only template_message 504, which may identify the specific error without any contextual and/or extraneous information that might not be important and/or useful for analysis and/or resolution of the error.

In some implementations, the system 200, as shown in FIG. 2, may be configured to use and/or generate one or more rules and/or sets of rules for performing the error message templatization process of error messages in an error message log. The rules may be pre-existing/pre-loaded/stored/etc. ("pre-existing rules") in the system 200. For example, the rules for converting the contextual error messages into templatized error messages may be generated by developers of a particular system, software application, module, etc. The developers of the system may generate such pre-existing rules during development. New rules may be generated as a result of occurrence of specific errors, frequency of errors, type of errors, etc. The rules may be associated with specific computing components and/or generated based on frequency of occurrence of errors, users'/systems'/etc. behaviors when responding to errors, and/or any other factors/combination of factors. The pre-existing rules and/or newly generated rules may be used during execution of simple text substation processes and/or regular expression processes, as discussed herein.

In some implementations, an error log file may include a APP.msg column that may contain an initial or un-templatized error message (e.g., with contextual content being included). At the start of the templatization process, this column may be copied into "template_message" column 504 (shown in FIG. 5). The column 504 may contain this original message until it is processed using message templatization rules into a templatized format, at which time, it may be replaced with the templatized message. Message templatization rules may be organized in accordance with a particular computing component (e.g., system module, software application, software application function, computing task, processing block, communications component, etc.). This may be helpful to avoid potential conflicts when similar errors are generated by different computing components.

As stated above, message processing rules may be defined using one or more of the following categories: simple text substitution or replacement rules and regular expression rules. In some cases, the system 200 (shown in FIG. 2) may be configured to check whether the system 200 may already include any pre-existing rules in either of these categories. If not, the system 200 may be configured to generate one or more of such rules (which may be based on the factors discussed above). Alternatively, or in addition to, the new message processing rules may be generated externally to the system 200.

In some implementations, the simple text substitution/replacement message processing rules may include one or more replacement conditions. By way of a non-limiting example, msg.startwith("Cannot find file") may be replaced with a replacement string of "File not found". Thus, the string "Cannot find file 'C:\temp\file.log'" will be replaced by "File not found", thereby extracting the local context from it. As such, the new value of the "template_message" column 504 will be "File not found".

Regular expression message processing rules are processing complex patterns such as, for example, "re.sub(r'The .* service response full content was "{\"message\":\"(.*?)',  r'\\l', s)". Using the regular expression message processing rules, the input message "The dataset service response full content was '502 Bad Gateway: Registered endpoint failed to handle the request.'" may be transformed into "502 Bad Gateway: Registered endpoint failed to handle the request." and the latter may be placed into the column 504 of the table 500 shown in FIG. 5.

Each error message in the error log may be processed using the simple text substitution/replacement rules that may be associated with and/or specific to a particular computing component. If after application of the simple text substitution/replacement rules to the error message, the error message is has not changed, the message may then be processed by the regular expression message processing rules. If after processing the message using the regular expression message processing rules, the message has not changed, the message will be stored in its original form and its value in column 504 will not change.

To determine whether new message processing rules may be necessary, the system 200 may be configured, after processing of the error message(s) from one or more error logs, to generate an aggregated count from the "template_message" column 504. The count (and corresponding messages) may be sorted in an ascending order, for example. The sorting may also be performed per computing component that generated error message. The resulting count may be exported into a control file. It should be noted, as most error messages are contextual in nature, newly processed messages may have a low count value. However, as more error logs and their corresponding messages are processed, the count for particular error messages may increase, thereby moving it up in the sorted count. The system 200 may be configured to monitor the error messages to identify new error message patterns in the error messages (e.g., those error messages that were originally classified as low count).

In some implementations, new error message processing may be generated and/or added automatically (e.g., by incorporating/connecting computing system build/development processes/systems and error message templatization processes). By way of a non-limiting example, error messages in the error logs may be generated using template messages, where a developer may replace tokens with arguments to add enough context for debugging. For instance, "Cannot find the file '{0}'" may be an error template used in a code and may automatically replace the token "{0}" by "(.*)?" to build a new search condition of a regular expression and by removing the token to obtain a fixed message "Cannot find the file". Thus, the process may be automated (which may be helpful for regular expressions processing which may be slower than simple text substitution/replacement).

Figure 6:
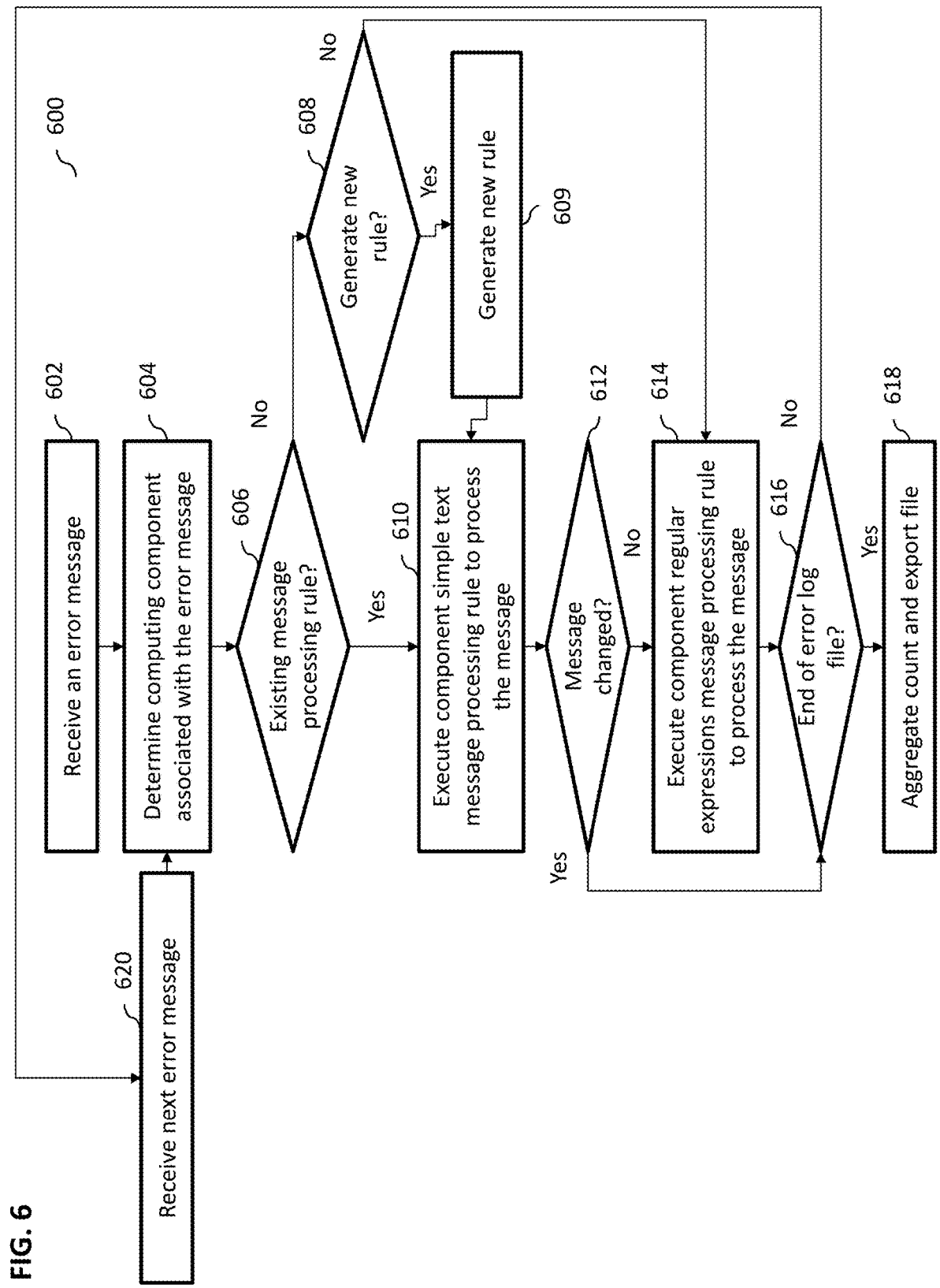
FIG. 6 illustrates an exemplary process for processing an error message in an error log using one or more message processing rules, according to some implementations of the current subject matter.

FIG. 6 illustrates an exemplary process 600 for processing an error message in an error log using one or more message processing rules, according to some implementations of the current subject matter. At 602, an error message from an error log may be received and/or extracted by the system 200 shown in FIG. 2. At 604, the system 200 may be configured to determined which computing component may have generated the received error message.

At 606, a determination may be made whether there exists a message processing rule that may be used to process this particular error message. If such processing rule exists, the message may be converted into a templatized format and inserted into column 504 of the table 500 (shown in FIG. 5). The templatized message may replace the corresponding original error message. Thus, if the error message processing rule exists for this particular error message, a component-specific simple text substitution/replacement message processing rule may be executed to covert the original message into its templatized version, at 610. Otherwise, if there is no rule, the system 200 may determine whether or not a new message processing rule should be generated (e.g., based on a count of specific error message, etc.), at 608. If so, such newly generated message processing rule may be generated, at 609, and applied to the error message, at 610.

If, at 612, after application of the component-specific simple text substitution/replacement message processing rule, the error message has not changed (e.g., its contextual part has not been removed, etc.), the processing may then proceed to 614. At 614, the component-specific regular expression message processing rule may be executed to process the error message.

Otherwise, the process 600 may determine whether end of error log may have been reached, at 616. If not, new error message may be processed, at 620. If end of error log has been reached, then a count associated with processed error messages may be generated and exported for analysis of patterns of error messages.

Figure 7:
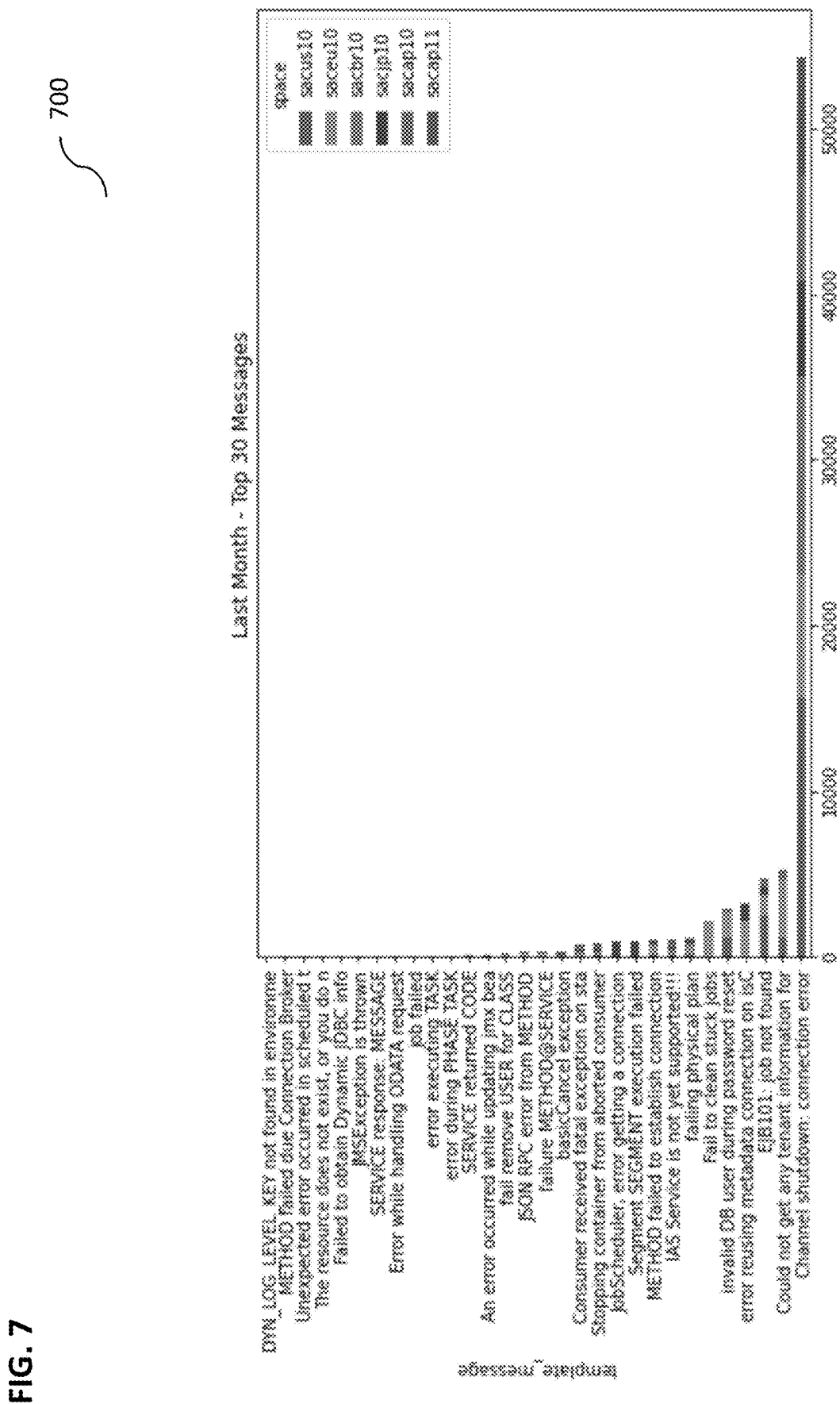
FIG. 7 illustrates an exemplary error message class chart, according to some implementations of the current subject matter.

In some exemplary implementations, conversion of error messages into templatized/standardized error messages may be helpful in identifying an error message class (e.g., grouping of errors). Error message classes may be used while executing analytics of error messages to determine, for example, a number of errors occurring in a specific error message class, frequency of specific errors, timing of errors, etc. FIG. 7 illustrates an exemplary error message class chart 700, according to some implementations of the current subject matter.

Moreover, the generated message templates may also be used for performing a correlation analysis between errors occurring in a system and one or more external causes that may be triggering the errors. By way of a non-limiting example, when using message brokering services, a deployment of a backing service may be correlated to a message template "Channel Shutdown: Connection error". This may be determined by executing filtering of data using template_message "Channel Shutdown: Connection error" to correlate of an error peak with a deployment time/date of a specific component of the backing service at one or more data centers during a specific date and/or time. Without message classes, such analysis might not be possible.

Additionally, use of message templates may be helpful in identifying cleansing errors. For example, analysis of the errors may be helpful in determining that certain errors and/or a large number of errors may be occurring at a specific time of day (e.g., midnight). For example, the templatized messages may be used to determine that errors may be occurring in connection with an specific template error message (e.g., "EJB 101: job not found"). Analysis of this error may reveal that a particular scheduled execution process may be incorrectly preventing other processes from execution.

Figures 1, 8:
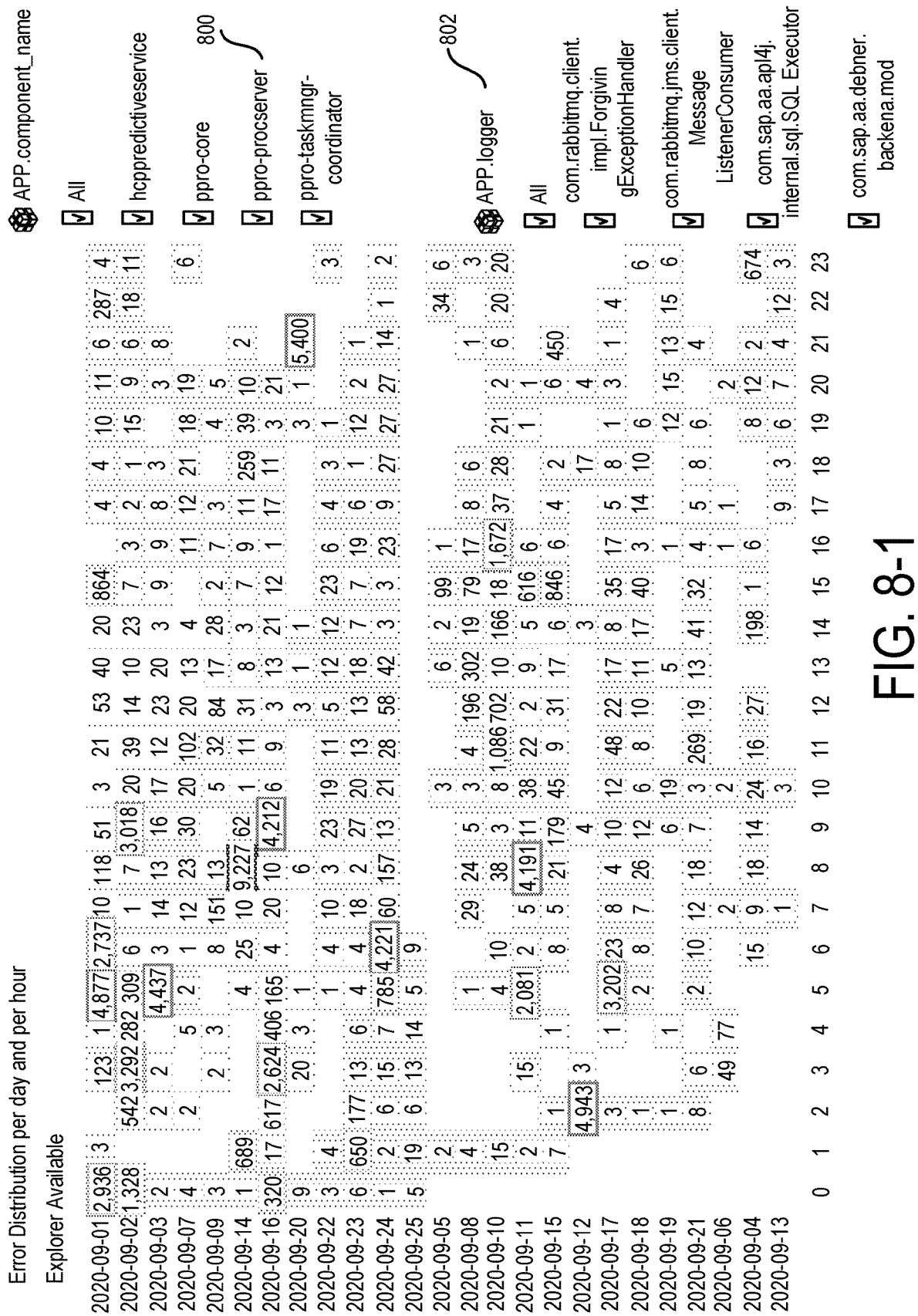
Figures 2, 8:
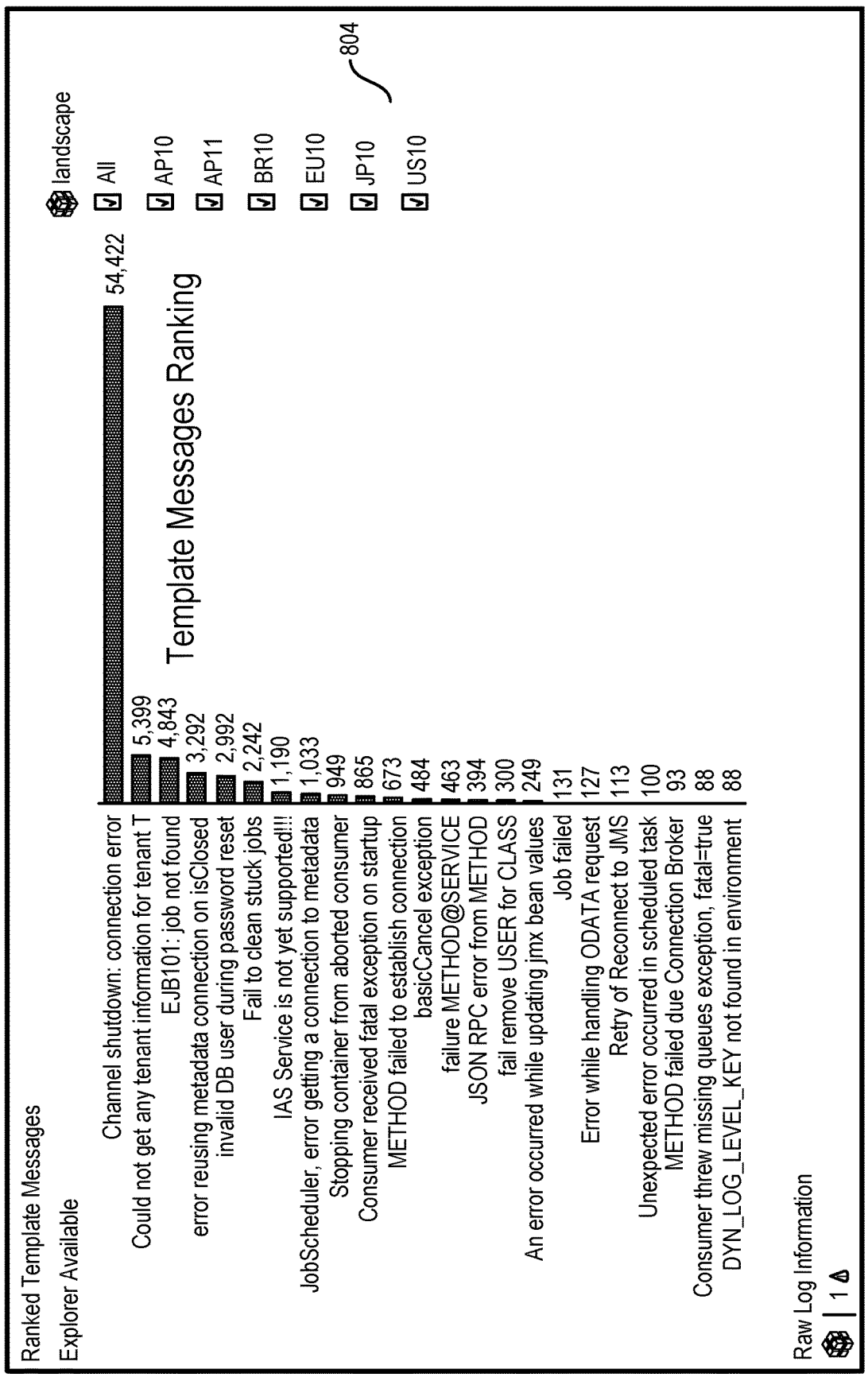

In some implementations, the message output interface 218 (as shown in FIG. 2) may be configured to generate an interactive dashboard 800, as shown in FIG. 8. For example, the dashboard 800 may include a heat map (e.g., per day, per hour, etc.) interface 802, a message template ranking interface 804, a raw log errors interface 806, and/or any other interfaces. One or more of these may be used for analysis of the error logs and/or determination of appropriate actions to take in order to reduce occurrence of errors.

Figure 9:
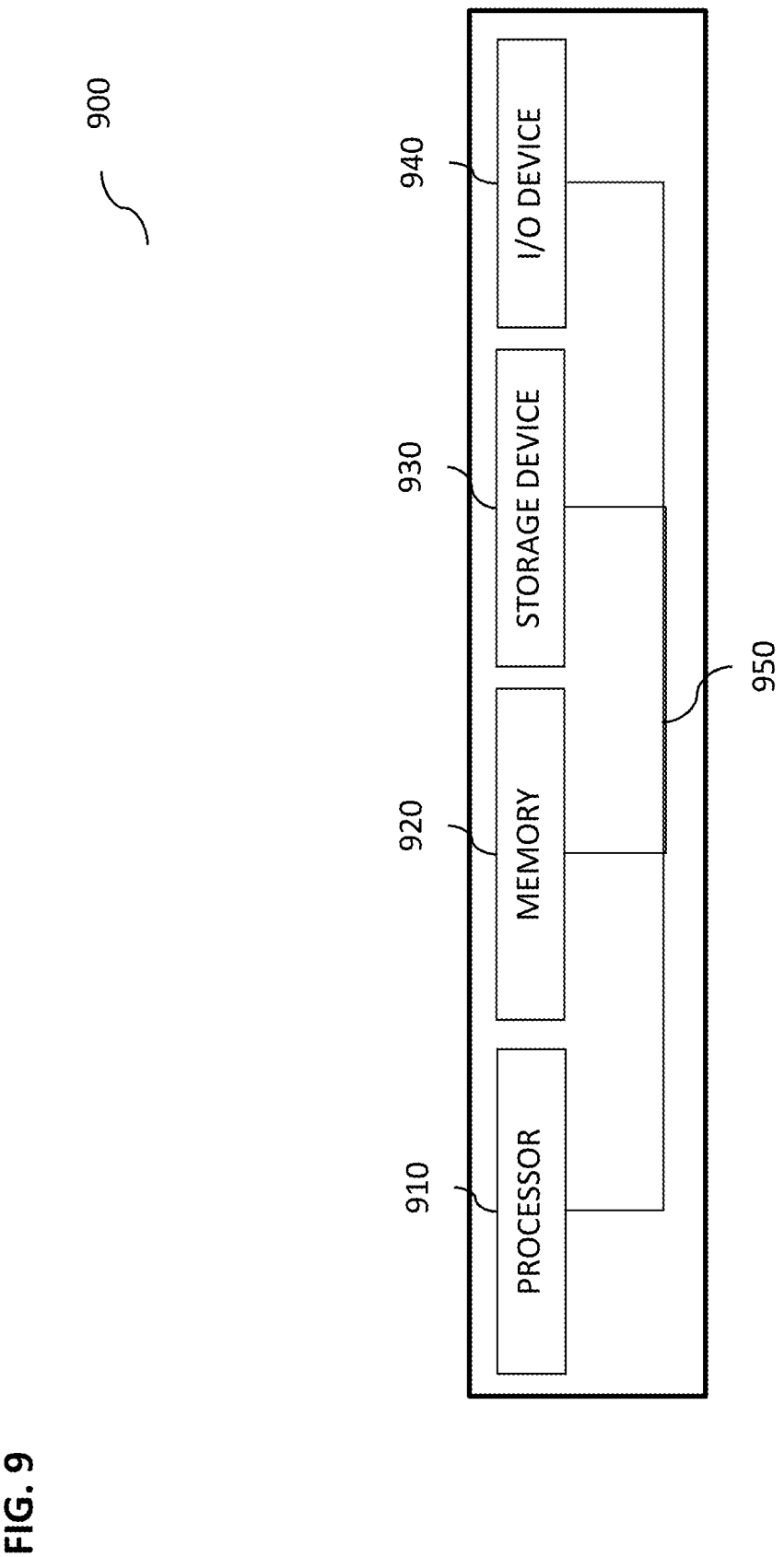
FIG. 9 illustrates an exemplary system, according to some implementations of the current subject matter.

In some implementations, the current subject matter can be configured to be implemented in a system 900, as shown in FIG. 9. The system 900 can include a processor 910, a memory 920, a storage device 930, and an input/output device 940. Each of the components 910, 920, 930 and 940 can be interconnected using a system bus 950. The processor 910 can be configured to process instructions for execution within the system 900. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

Figure 10:
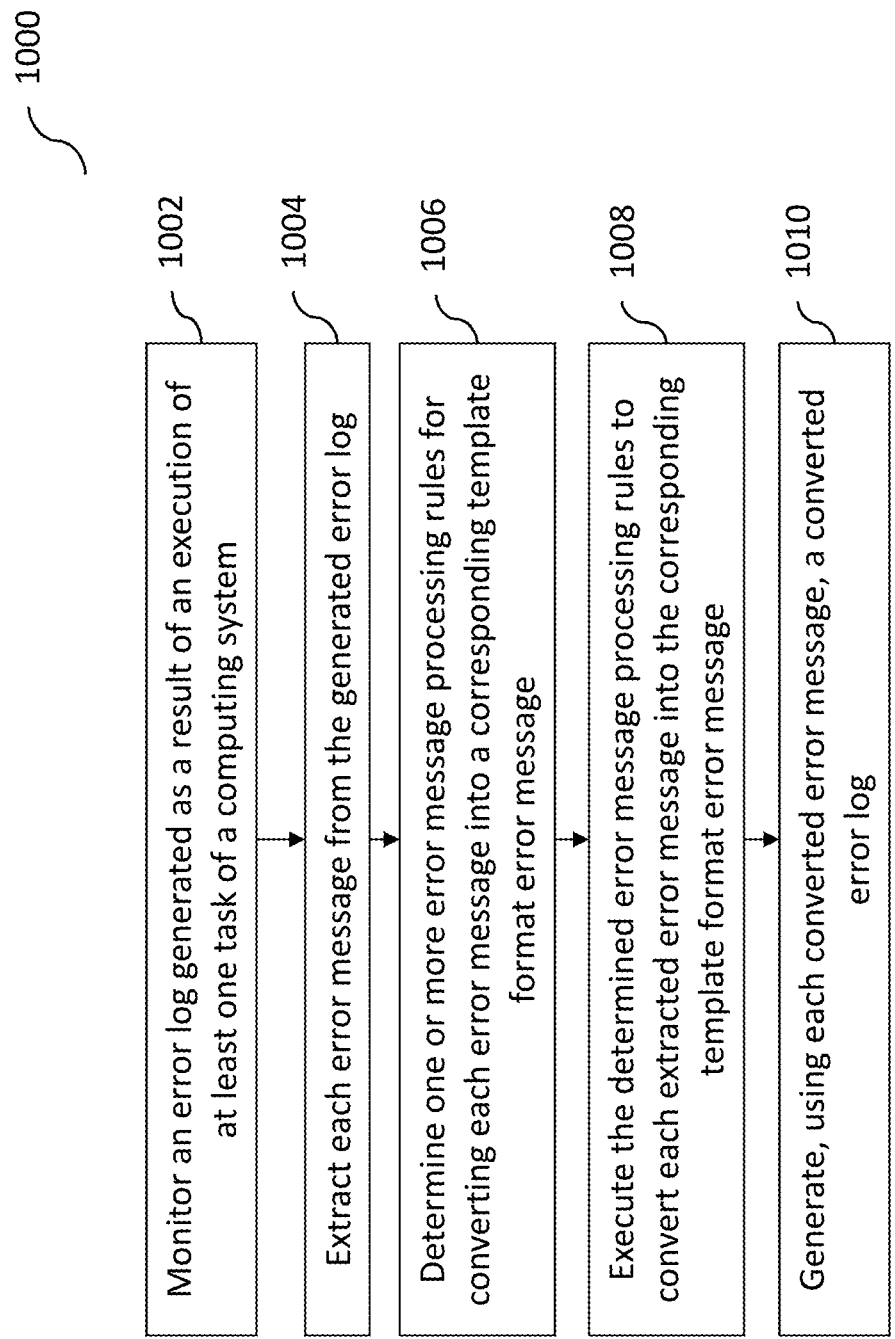
FIG. 10 illustrates an exemplary method, according to some implementations of the current subject matter.

FIG. 10 illustrates an exemplary method 1000 for templatizing error messages in computing systems, according to some implementations of the current subject matter. The process 1000 may be executed by the system 100 shown in FIG. 1 and/or system 200 shown in FIG. 2. At 1002, an error log generated as a result of an execution of at least one task (e.g., system module, software application, software application function, computing task, processing block, communications component, etc.) of a computing system may be monitored. The monitoring of error logs may be performed by the log analysis system 204 shown in FIG. 2 In particular, the log monitoring module 210 may be configured to monitor error logs generated by one or more computing components of the cloud system 108. In some exemplary implementations, the error log may include a plurality of error messages (as for example shown in FIG. 3). Each error message in the plurality of error messages may include a first portion (e.g., an identification of the error) and a second portion (e.g., contextual information that may be added to the error message to provide additional information, whereby the contextual information may be extraneous and/or not necessary for the purposes of error identification, analysis, and/or resolution).

At 1004, each error message may be extracted from the generated error log. For example, message extraction module 212 (shown in FIG. 2) may be used for the purposes of extracting messages from the error log for conversion purposes. At 1006, one or more error message processing rules (e.g., simple text substation/replacement, regular expression rules) for converting each error message into a corresponding template format error message may be determined. The error message processing rules may be associated with the task that is being executed. At 1008, the determined error message processing rules to may be executed to convert each extracted error message into a corresponding template format error message (e.g., as shown by the converted messages 404 in FIG. 4*a*; converted messages 414 in FIG. 4*b*; and/or messages in the template_message column 504 shown in FIG. 5). The converted error message may include the first portion, where the second portion may be removed from the converted error message (e.g., as shown in FIGS. 4*a-b* and 5).

At 1010, a converted error log may be generated using each converted error message. An exemplary converted error log is shown by the template_message column 504 in FIG. 5. The converted error log may be further displayed, transmitted, analyzed and/or stored.

In some implementations, the current subject matter can include one or more of the following optional features. In some implementations, the conversion may include selecting one or more error message templates in a plurality error message templates to generate each converted error message.

In some implementations, the conversion may include executing one or more simple text substitution processing rules in the one or more error message processing rules for each extracted error message to generate each corresponding converted error message.

In some implementations, the conversion may include executing one or more regular expressions processing rules in the one or more error message processing rules for each extracted error message to generate each corresponding converted error message upon determination that execution of the simple text substitution processing rules failed.

In some implementations, the first portion of each extracted error message may include an identification of an error generated by the execution of the at least one task by the computing system. The second portion of each extracted error message may include contextual information associated with the error generated by the execution of the at least one task by the computing system.

In some implementations, the method 1000 may also include grouping the converted error message into an error message class, the error message class being indicative of a cause of the error message, and analyzing the error message class to determine a source of an error generated by the execution of the at least one task by the computing system.

In some implementations, the method 1000 may include monitoring the execution of the determined error message processing rules to determine a number of times each determined error message processing rule has been executed to convert an error message into a template format error message, and determining, based on the monitoring, one or more patterns of error messages. The method may also include generating one or more new error message processing rules based on the determined patterns of error messages.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    monitoring, by one or more processors, an error log generated as a result of an execution of at least one task of a computing system, the error log comprising a plurality of error messages, each error message in the plurality of error messages comprising a first portion indicative of an error and a second portion comprising extraneous data that is unnecessary for solving the error;
    extracting, by the one or more processors, each error message from the error log;
    determining, by the one or more processors, one or more error message processing rules for converting each error message into an error message with a corresponding template format, the one or more error message processing rules being associated with at least one task;
    executing, by the one or more processors, the one or more error message processing rules to convert each extracted error message into the error message with the corresponding template format, the error message comprising the first portion, the second portion being removed from the error message;
    generating, by the one or more processors, using each converted error message, a converted error log;
    processing, by the one or more processors, the converted error log to generate a solution; and
    providing, by the one or more processors, the solution to resolve the error identified as a source of the plurality of error messages at the computing system and to complete execution of the at least one task.

2. The method according to claim 1, wherein the converting comprising selecting one or more error message templates in a plurality error message templates to generate each converted error message.

3. The method according to claim 1, wherein the converting comprises executing one or more simple text substitution processing rules in the one or more error message processing rules for each extracted error message to generate each corresponding converted error message.

4. The method according to claim 3, wherein converting comprises executing one or more regular expressions processing rules in the one or more error message processing rules for each extracted error message to generate each corresponding converted error message upon determination that execution of the simple text substitution processing rules failed.

5. The method according to claim 1, wherein the first portion of each extracted error message comprises an identification of an error generated by an execution of the at least one task by the computing system.

6. The method according to claim 5, wherein the second portion of each extracted error message comprises contextual information associated with the error generated by the execution of the at least one task by the computing system.

7. The method according to claim 1, further comprising grouping the error message into an error message class, the error message class being indicative of a cause of the error message; and
    analyzing the error message class to determine a source of an error generated by an execution of the at least one task by the computing system.

8. The method according to claim 1, further comprising monitoring the executing of the one or more error message processing rules to determine a number of times each error message processing rule has been executed to convert an error message into a template format error message; and
    determining, based on the monitoring, one or more patterns of error messages.

9. The method according to claim 8, further comprising generating one or more new error message processing rules based on the one or more patterns of error messages.

10. A system comprising:
- at least one programmable processor; and
- a non-transitory machine-readable medium storing instructions that, when executed by the at least one programmable processor, cause the at least one programmable processor to perform operations comprising:
  - monitoring an error log generated as a result of an execution of at least one task of a computing system, the error log comprising a plurality of error messages, each error message in the plurality of error messages comprising a first portion indicative of an error and a second portion comprising extraneous data that is unnecessary for solving the error;
  - extracting each error message from the error log;
  - determining one or more error message processing rules for converting each error message into an error message with a corresponding template format, the one or more error message processing rules being associated with at least one task;
  - executing the one or more error message processing rules to convert each extracted error message into the error message with the corresponding template format, the error message comprising the first portion, the second portion being removed from the error message;
  - generating using each converted error message, a converted error log;
  - processing the converted error log to generate a solution; and
  - providing the solution to resolve the error identified as a source of the plurality of error messages at the computing system and to complete execution of the at least one task.

11. The system according to claim 10, wherein converting comprising selecting one or more error message templates in a plurality error message templates to generate each converted error message.

12. The system according to claim 10, wherein converting comprises executing one or more simple text substitution processing rules in the one or more error message processing rules for each extracted error message to generate each corresponding converted error message.

13. The system according to claim 12, wherein converting comprises executing one or more regular expressions processing rules in the one or more error message processing rules for each extracted error message to generate each corresponding converted error message upon determination that execution of the simple text substitution processing rules failed.

14. The system according to claim 10, wherein the first portion of each extracted error message comprises an identification of an error generated by an execution of the at least one task by the computing system.

15. The system according to claim 14, wherein the second portion of each extracted error message comprises contextual information associated with the error generated by the execution of the at least one task by the computing system.

16. The system according to claim 10, wherein the operations further comprise
- grouping the error message into an error message class, the error message class being indicative of a cause of the error message; and
- analyzing the error message class to determine a source of an error generated by an execution of the at least one task by the computing system.

17. The system according to claim 10, wherein the operations further comprise
- monitoring the executing of the one or more error message processing rules to determine a number of times each error message processing rule has been executed to convert an error message into a template format error message; and
- determining, based on the monitoring, one or more patterns of error messages.

18. The system according to claim 17, wherein the operations further comprise generating one or more new error message processing rules based on the one or more patterns of error messages.

19. A computer program product comprising a non-transitory machine-readable medium storing instructions that, when executed by at least one programmable processor, cause the at least one programmable processor to perform operations comprising:
- monitoring an error log generated as a result of an execution of at least one task of a computing system, the error log comprising a plurality of error messages, each error message in the plurality of error messages comprising a first portion indicative of an error and a second portion comprising extraneous data that is unnecessary for solving the error;
- extracting each error message from the error log;
- determining one or more error message processing rules for converting each error message into an error message with a corresponding template format, the one or more error message processing rules being associated with at least one task;
- executing the one or more error message processing rules to convert each extracted error message into the error message with the corresponding template format, the error message comprising the first portion, the second portion being removed from the error message;
- generating using each converted error message, a converted error log;
- processing the converted error log to generate a solution; and
- providing the solution to resolve the error identified as a source of the plurality of error messages at the computing system and to complete execution of the at least one task.

20. The computer program product according to claim 19, wherein converting comprising selecting one or more error message templates in a plurality error message templates to generate each converted error message.

* * * * *